Feb. 10, 1942. W. C. SISSON 2,272,332
RING-LOCKING MEANS FOR FISHHOOK KNOTS
Filed Dec. 2, 1940
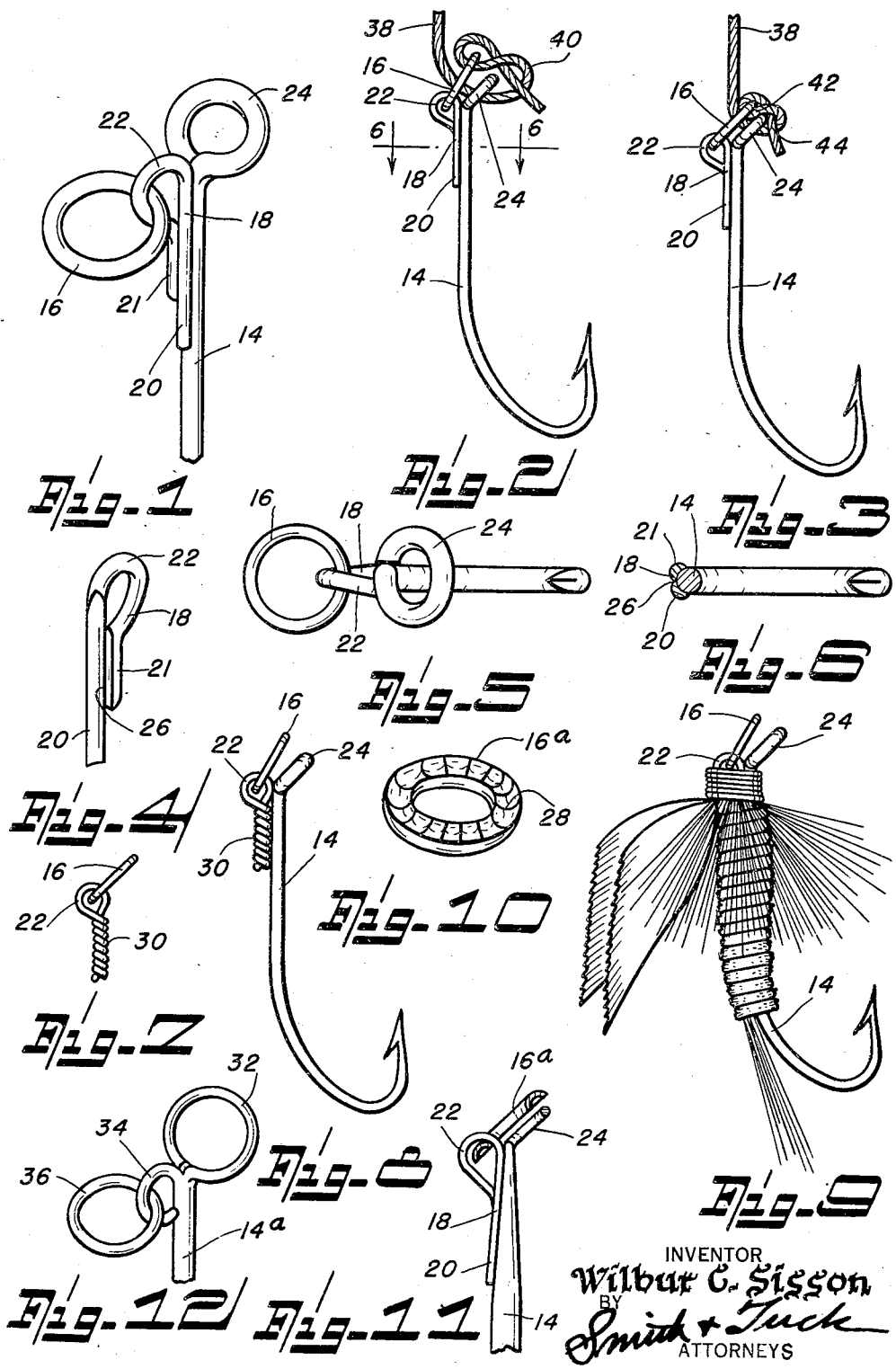
INVENTOR
Wilbur C. Sisson
BY
Smith + Tuck
ATTORNEYS Patented Feb. 10, 1942

2,272,332

UNITED STATES PATENT OFFICE 2,272,332

RING-LOCKING MEANS FOR FISHHOOK KNOTS

Wilbur C. Sisson, Seattle, Wash.

Application December 2, 1940, Serial No. 368,242

7 Claims. (Cl. 43—28)

My present invention relates to the art of fish hook construction and more particularly to a ring-locking means for fish hook knots.

My invention provides a means for forming a simple, non-slipping knot for attaching leaders and the like to fish hooks. It consists essentially of a pivoted ring arranged to co-act with the eye of a fish hook so that the leader may be looped through the two rings and when pulled tight a locking of the knot is effected. For different uses my arrangement may be slightly varied. For use with the ordinary fish hook that normally is baited, I find it most convenient to weld or braze onto the hook a ring of such a diameter that when it is folded over on the eye of the hook the outer edge of the pivoted ring will lie substantially on top of the outer ring of the hook's eye. In other forms, the ring may be held in place and the snelling or fly body may be built up on anchor means, thus holding it securely in position.

The principal object of my present invention, therefore, is to provide a convenient means for forming a line or leader engagement with a hook that will be self-locking, and yet very easily removed when desired.

A further object of my present invention is to provide means whereby the newer forms of leader material which have a pronounced tendency to slip when ties in a conventional knot may be securely locked in the desired position.

A further object of my present invention is to provide means for making use of a two-ring lock or securing means, and adapting it to fish hooks so as to provide a quickly secured and easily released means of attaching a hook to a leader.

Other and more specific objects will be apparent from the following description taken in connection with the accompanying drawing, wherein:

Figure 1 is a fragmentary view showing a portion of a fish hook with the eye of the same considerably enlarged and showing one form of securing my loose locking ring to the hook.

Figures 2 and 3 are views in elevation showing, respectively, the method of tying a leader or line to a hook equipped with my device, and the appearance of the knot after the same is tightened.

Figure 4 is a perspective view showing the ring positioning pivot member which is adapted to be secured as by welding or brazing to the shank of a fish hook.

Figure 5 is a top plan view of my line securing means with the parts in the same general position as shown in Figure 1.

Figure 6 is a cross-sectional view taken along the line 6—6 of Figure 2.

Figure 7 illustrates a modified form of anchor for my loose locking ring.

Figure 8 is an elevation showing the positioning of my modified ring securing means before it is wrapped, as with snelling or a fly body to hold it in position.

Figure 9 is an elevation, somewhat enlarged, of a fishing fly, showing the manner in which my device is employed with a fly, and principally showing how inconspicuous my device becomes under such conditions.

Figure 10 is a perspective view showing the serrated under side of one form of loose ring used with my device.

Figure 11 illustrates a modified form of my device which is employed with a tapered shank hook, and showing the ring illustrated in Figure 10.

Figure 12 is a further modified arrangement of my device in which the fish hook is provided with a slit upper shank, one portion of which is formed in the conventional eye and with the other portion formed as an anchor means for the loose or locking ring.

Referring to the drawing, throughout which like reference characters indicate like parts, 14 designates a shank of a fish hook. This may be any desired type or size used for fishing. The type of fish hook, however, will require certain modifications in my knot-securing arrangement. Where the hook is to be baited or supplied as a finished product to other fly tiers, for instance, the locking ring of my device, as 16, should be secured to the shank by an anchor means 18 which is preferably welded or brazed to the hook shank. This construction is probably best illustrated in the perspective view of Figure 1. Here it will be noted that the anchor 18 is provided with preferably a long leg as 20 and a short leg 21 which are flattened or made slightly concave so as to more snugly fit the shank 14. At their upper end, legs 20 and 21 are joined by the I-shaped portion 22. This should provide reasonable freedom for ring 16 so that it will work freely and will not be bound at any point of its swing so that full advantage can be taken of its locking function. It has been found, however, that the ring 16 and eye 22 should bear definite relationship to the eye 24 of the fish hook. This relationship is probably best illustrated in Figures 3 and 11, in which it will be noted that the upper extent of ring 16 will lie directly over the outward extended portion of eye 24 and that serves to pinch the line or leader between the two metal members after the showing particularly of Figure 3. The exact construction of anchor 18 is probably best illustrated in Figure 4 where it will be noted that the two legs abut each other, as at 26, so that when they engage shank 14 will, after the showing of Figure 6, lie snugly against the same and will not offer any decided bulge in the body of the shank that will interfere with the snelled wrapping or the building up of the fly body thereon. To this end I find it most desirable to have the two legs, as 20 and 21, of different lengths.

For use particularly with those materials that become quite slippery when wet I find it desirable to use a modified form of ring, as 16a, in which the under surface is grooved annularly and is preferably serrated as illustrated in Figure 10. This grooved portion is arranged to fit over eye 24 which it will snugly engage at its furthest outward extent, after the showing of Figure 11. Under such conditions, when the line is knotted as in Figure 3, a most secure engagement will be effected. The line or leader spaces ring 16a slightly away from eye 24 so that, in effect, the groove which is of greater diameter normally than the eye 24 does not actually fit over the same, but the leader under pressure is forced up into the groove and engaged by the serrations, as 28.

In Figures 7 and 8 I have illustrated a modified form of anchor. This form is usable normally only when fly bodies of considerable thickness are to be built up on the hook. In this instance the anchor is formed of wire which is twisted back on itself, as at 30, and the twisted portion is usually clamped against shank 14 in the fly-tying vise and held in this position until the wrappings which form the base of the fly body are put in place, after which time it is adequately held in position. The body of the fly is then built up on the hook after the showing of Figure 9, and the twisted wire anchor is then well concealed. In this arrangement, it is necessary to have the same general relationship between the loose or clamping rings 16 and the eye of the hook, namely that when it is in its clamping position the outer margin of the clamping ring should lie immediately above the outer margin of the hook's eye.

In Figure 12 I have illustrated a modified form of hook which may be employed where a hook is specially made for use with my clamping arrangement. Here, the shank 14a is split at its upper end, one of the portions forming the fixed eye 32, while the other portion 34 is bent back so as to form the anchoring means for the clamping ring 36. When such an arrangement is employed it will be noted that it is possible to employ a ring 36 more nearly the same size as ring 32, but again the relationship of the two rings meeting at their outer extremities should be preserved.

*Method of use*

To tie a fishing leader or line knot with my improved means, the leader 38 is passed downwardly through both the loose ring 16 and the eye of the hook 24. The loose ring is then moved away from eye 24 and the line is passed upwardly through ring 16. After passing through ring 16 the leader is then bent back on itself and tucked through loop 40 which has just been formed. This completes the knot proper. It is then tightened by pulling upwardly on line 38. This has the action of bringing the clamping ring in close proximity to eye 24 and serves to pinch therebetween the portion 42 of the leader. At the same time the upward strain on the main part of the leader 38 pinches the free end 44 of the leader and thus a knot, or more properly a bend, is effected in the leader that locks the same securely in place.

When it is desired to detach the hooks from the leader a reversal of the operation is executed, in which the main leader portion 38 is grasped close to the hook and pushed downwardly, so that the leader passes down through both the clamping ring and the eye of the hook. This frees end 44 and gives enough slack so that the clamping ring 16 can be moved away from the eye of the hook until the position shown in Figure 2 is again effected. It will then be seen that the free end 44 can be pulled out of loop 40 and it then is released.

Throughout my drawing I have illustrated for the sake of simplicity a hook having an eye bent in the most usual manner. It will be apparent it is believed, that the same locking operation could be effected with the face of the eye in a plane parallel to the shank 14 of the hook or even if it were reversed.

The foregoing description and the accompanying drawing are believed to clearly disclose a preferred embodiment of my invention, but it will be understood that this disclosure is merely illustrative and that such changes in the invention may be made as are fairly within the scope and spirit of the following claims.

I claim:

1. The method of joining a fishing line to a fish hook having an eye on the hook shank and a ring loosely mounted adjacent said eye and capable of swinging to lie substantially parallel thereto, said method comprising passing an end of the line through the loosely mounted ring and simultaneously passing said line end through the eye from the same direction, bending said line upon itself to form a bight, returning the line past the outside of the eye and passing it through the loosely mounted ring in a direction in opposition to the first pass therethrough, forming a return bight in said line outside said loose ring and tucking the line end through the bight formed by the first mentioned return bend past the eye.

2. The method of joining a fishing line to a fish hook having an eye on the hook shank and a ring loosely mounted adjacent said eye and capable of lying substantially parallel thereto, said method comprising passing an end of the line through said ring and simultaneously through said eye from the same direction, bending said line upon itself to form a bight, returning the line past the outside of the last member passed through and passing it through the first member in a direction in opposition to the first pass therethrough, forming a return bight in said line outside the last mentioned member, and passing the line end through the bight formed by the first mentioned return bend.

3. The method of joining a fishing line to a fish hook having an eye on the hook shank and a ring loosely mounted adjacent said eye and capable of lying substantially parallel thereto, said method comprising threading an end of the line through the loosely mounted ring and simultaneously passing said line end through the eye from the same direction, bending said line upon itself to form a bight and returning the line past the outside of the eye and threading it through the loosely mounted ring in a direction in opposition to the first pass therethrough, forming a return bight in said line outside around said loose ring and tucking the line end through the bight formed by the first mentioned return bend past the eye, and subsequently tautening the standing part of said line, thus tightening the loops in the line intertwined about the eye, the ring and about itself to firmly secure the fishing line to the hook.

4. In a fish hook having a shank and a hook, line attaching means comprising a fixed eye mounted on said shank at an angle to its longitudinal axis for engagement by a fishing line, a loop having a shank lying along the hook shank and secured thereto adjacent said fixed eye, said loop lying transversely of the plane of the fixed eye, and a ring swingingly mounted in said loop for super-positioning with relation to said fixed eye.

5. In a fish hook having a shank and a hook, line attaching means comprising a fixed eye mounted on said shank at an angle to its longitudinal axis for engagement by a fishing line, a loop having a shank secured to said hook shank adjacent said fixed eye and lying transversely of the plane of the fixed eye, and a ring swingingly mounted in said loop for super-positioning with relation to said fixed eye.

6. In a fish hook having a shank and a hook, line attaching means comprising an eye mounted on said shank at an angle to its longitudinal axis for engagement by a fishing line, a loop secured to said hook shank adjacent said eye and lying transversely of the plane of the eye, and a ring swingingly mounted in said loop for super-positioning with relation to said eye.

7. In a fish hook having a shank and a hook, line attaching means comprising an eye mounted on said shank for engagement by a fishing line; a loop secured to said hook shank adjacent said eye and lying transversely of the plane of the eye, and a ring swingingly mounted in said loop for super-positioning with relation to said eye.

WILBUR C. SISSON.